United States Patent [19]

Schou et al.

[11] Patent Number: 4,748,027

[45] Date of Patent: May 31, 1988

[54] POWDER PRODUCT AND A METHOD FOR ITS PREPARATION

[75] Inventors: Herbert Schou, Juelsminde; Jack A. Dreyer, Horsens, both of Denmark

[73] Assignee: Nexus ApS, Juelsminde, Denmark

[21] Appl. No.: 797,678

[22] PCT Filed: Feb. 27, 1985

[86] PCT No.: PCT/DK85/00018

§ 371 Date: Oct. 28, 1985

§ 102(e) Date: Oct. 28, 1985

[87] PCT Pub. No.: WO85/03846

PCT Pub. Date: Sep. 12, 1985

[30] Foreign Application Priority Data

Feb. 29, 1984 [DK] Denmark .............................. 1487/84

[51] Int. Cl.$^4$ .............................................. A23L 1/035
[52] U.S. Cl. ......................................... 426/96; 426/98; 426/103; 426/653; 426/453; 426/662; 426/654; 426/549; 426/804
[58] Field of Search ................... 426/96, 98, 103, 653, 426/453, 662, 654, 549, 804; 252/91, 174.13

[56] References Cited

U.S. PATENT DOCUMENTS

| | | | |
|---|---|---|---|
| 2,555,467 | 6/1951 | Bogin et al. | 426/98 |
| 2,555,468 | 6/1951 | Bogin et al. | 426/98 |
| 2,949,365 | 8/1960 | Becker | 426/98 |
| 3,689,290 | 9/1972 | Blackstock et al. | 426/96 |
| 3,743,512 | 7/1973 | Hansen et al. | 426/96 |
| 3,791,852 | 7/1976 | Brenner et al. | 426/98 |
| 3,924,018 | 12/1975 | Sims | 426/98 |
| 3,973,046 | 8/1976 | Mol | 426/98 |
| 4,007,284 | 2/1977 | Goryaev et al. | 426/98 |
| 4,310,556 | 1/1982 | Suggs | 426/98 |
| 4,382,967 | 5/1983 | Koshidat | 426/98 |
| 4,461,782 | 7/1984 | Robbins | 426/804 |
| 4,500,552 | 2/1985 | Kadison | 426/98 |
| 4,575,395 | 3/1986 | Rudin | 426/96 |

*Primary Examiner*—Jeanette Hunter
*Attorney, Agent, or Firm*—John P. White

[57] ABSTRACT

A substantially free-flowing powder comprising a surface-active agent such as a food emulsifier applied on a particulate carrier such as a starch is prepared by mixing the suface-active substance with the carrier and subjecting the resulting mixture to extrusion.

14 Claims, No Drawings

POWDER PRODUCT AND A METHOD FOR ITS PREPARATION

The present invention relates to a substantially free-flowing powder product and to a method for its preparation.

Certain surface-active products, for example food-improving surface-active agents such as emulsifiers or aerating agents (aerating agent is a designation used in the food industry for an emulsifier which is used for whipping purposes, in other words for preparing emulsions where air constitutes the disperse phase) for use in the food industry, such as emulsifiers which are partial fatty acid esters of glycerol or glycerol condensates, are substances of a fat-like consistency and behaviour, or expressed in another manner, substances of a lipid character.

For addition to the products which they are to aerate or emulsify, for example bread dough or cake mixes, they are suitably used in the form of a powder, preferably a free-flowing powder.

It is known to prepare such powders by spray-drying or by application of the surface-active substance on sucrose particles as a carrier. Thus, one known method for preparing such powders is to spray-dry an emulsion made from skim milk or whey and an emulsifier. Often, it is necessary to take special precautions to spray-dry the emulsion under particularly gentle conditions in order to avoid any substantial impairment of their surface-active properties. Spray-drying requires extensive apparatus and requires that the surface-active substance be converted into a dissolved or suspended state from which the solvent is removed in the spray-drying process. Owing to the parameters of the spray-drying process, there are certain limitations with respect to the composition of the final product, its specific gravity, etc. The method in which sucrose is used as a carrier comprises applying an emulsifier on sucrose particles, e.g. icing sugar, by mill mixing. In this method, it is normally not possible to apply more than about 10-15% by weight of the surface-active substance on the sucrose. This may be a too low concentration of emulsifier for certain purposes, and an emulsifier applied on sucrose will necessarily introduce a certain amount of sucrose into the products in which it is used, which is not always desired.

The present invention provides a simple and economic method for preparing a desirable novel substantially free-flowing powder surfactant product.

The product of the invention is a substantially free-flowing powder product comprising one or several surface-active substances applied on a particulate carrier in an amount of at least 10% by weight, calculated on the weight of the product, with the proviso that the carrier does not consist of sucrose.

The surface-active substance is normally a surface-active substance of lipid character, in particular a food-improving surface-active such as e.g., an emulsifier or aerating agent for use in the food industry, in particular the bakery industry.

The carrier is preferably of vegetable origin, and interesting carriers are carriers selected from flours, starches, mono- and disaccharides and pentosans and mixtures thereof, optionally with an admixture of material of vegetable fibre origin.

It is generally preferred that the carrier is one which contains or consists of starch.

As examples of such carriers which are of great interest in connection with surface-active substances for use in the food industry may be mentioned tuber starches or flours such as potato starch, batat starch and yam starch, sago starch, bean flour and pea flour, cereal starches or flours such as rice starch, wheat starch, rye starch, barley starch, oat starch, rice flour, wheat flour, rye flour, barley flour, oat flour, and maize starch, maltodextrins, dextrose, fructose, and mixtures thereof.

It is, however, within the scope of the invention to use a carrier which is of animal origin, e.g. bone meal or blood meal, which may be of interest in connection with certain surface-active substances, or of inorganic origin, such as chalk, bentonite, or talc, which may especially be of interest in connection with industrial surface-active substances.

The particulate carriers are normally carriers, the particles of which have a particle size distribution with a major fraction having a size in the range of about 1-20 $\mu$m, in particular 1-10 $\mu$m, although carriers of somewhat larger size, e.g. with major factions of up to about 20-50 $\mu$m or even 50-100 $\mu$m may also be used. However, as is discussed below, it is often preferred that the carriers have very small particle sizes, for examples with major particle size fractions in the range of 1-5 $\mu$m or less.

In especially interesting products of the invention, the surface-active substance is a food-improving surface-active agent, e.g., a dough-improving agent, a dough emulsifier, an antitack agent, a meat water-binding improving agent, an aerating agent for use in the food or bakery industry, an ice cream emulsifier, a fine food emulsifier, a crystal growth-modifying agent for use in confectionery, a pharmaceutical surface-active agent and/or a cosmetic surface-active agent.

Thus, the surface-active substance or substances may comprise an emulsifier, in particular a food emulsifier, optionally with an admixture of a component or components which it may be conventional and/or desirable to combine with an emulsifier, such as a stabiliser, a thickening agent and/or a gelling agent or mixtures of such additions. Normally, such admixtures added to the surface-active substance or substances will constitute at the most 20%, preferably at the most 10%, and more preferably at the most 5% of the combined weight of the surface-active substance or substances and the admixture, and for most purposes, it is preferred that the admixture or admixtures of stabilizer, thickening agent and/or gelling agent, when present, constitute at the most 1% of the combined weight of the surface-active substance or substances and the admixture. If it is desired to have a stabilizer, a thickening agent and/or a gelling agent present in the product, it may also be incorporated as part of the carrier.

As examples of stabilizers or thickening agents may be mentioned alginates, carboxymethylcellulose, and microcrystalline cellulose, and as an example of a gelling agent may be mentioned pectin.

Important embodiments of the invention are powders in which the surface-active substance is an emulsifier which is a partial ester of a polyhydric alcohol such as ethylene glycol or glycerol or of a condensate of ethylene glycol or of glycerol, a sugar, or sorbitol, with an edible fatty acid and optionally with lactic acid, citric acid, malic acid, tartaric acid or acetic acid, or a mixture of such esters, optionally with an admixture of at the most 20%, preferably at the most 10%, more preferably at the most 5%, and most preferably at the most 1%, of a stabilizer, thickening agent and/or gelling agent, e.g. a gelling agent of the alginate type. As is well known, emulsifiers of types as mentioned above may obtain better emulsifying properties for certain purposes when they are combined with substances which are not in themselves surface-active, such as a partial ester of propylene glycol and/or a propylene glycol condensate with a fatty acid. Such combinations are also contemplated for use in connection with the present invention. Other examples of food-improving emulsifiers are lecithin and modified lecithin which are used, e.g. as flour-improving agent or as dough-improving agent.

Among the above-mentioned food emulsifiers, very interesting food emulsifiers for incorporation in the products of the invention are partial esters of glycerol and/or glycerol condensates.

The powder products of the invention, such as powders in which the surfaceactive agents are food-improving agents of the types mentioned above, are advantageous in that they may be prepared simpler and much more economically than by means of spray drying, such as is explained in the following. They are easy to administer to the compositions to which they are to be added, and are well compatible with products of the food or bakery industry. Also, they can be made with optimum retention of the surface-active properties of the surface-active substance. As a general rule, they will be used in the same amount and in the same manner as other commercial forms of the surface-active substance, calculated on the basis of the weight of the surface-active substance.

In the products of the invention, the percentage of surface-active substance or substances is normally in the range of 10–60%, such as 10–50%, and often preferably 15–50%, in particular 15–40%, calculated on the total weight of surface-active substance or substances and the carrier.

The invention also relates to a particularly advantageous method for preparing a substantially free-flowing powder product having the above-described characteristics. This method comprises mixing one or several surface-active substances with one or several particulate carriers and subjecting the resulting mixture to extrusion or an equivalent treatment to form a substantially free-flowing powder.

It has been found that when a surface-active substance and a suitable particulate carrier, in particular a carrier which is able to become "wetted with" or to "sorb" (adsorb and/or absorb) the surface-active substance under the conditions prevailing, is subjected to extrusion, it is possible to obtain an extrudate which, instead of having the form of an extruded string of the mixture, immediately disintegrates into a powder product with highly desirable properties.

Suitable carriers are the ones mentioned above, in particular particulate carriers which are starches or flours. While these preferred carriers may be used as they are (with particle size distributions which often have a major fraction having a size in the range of about 1–20 μm and preferably 1–10 μm, but may also be somewhat larger, e.g. with major fractions of up to 20–50 μm or even 50–100 μm), it is contemplated that it may be advantageous to secure a very fine particle size of the carriers, such as 1–5 μm or finer, by subjecting the carriers to additional comminution beyond the comminution which such products (for example flours or starches) have normally been subjected to. Such additional comminution may, e.g., be performed in a circular-chamber jet mill or a blender type mill.

The vegetable flour or starch carriers may, if desired, be combined with fibrous materials to obtain a starch or flour/fiber combination carrier, provided that the fibrous materials in the final product have about the same "particle" size (e.g. fiber length) as the flour or starch particles, such as a size in the range of 1–100 μm, in particular 1–20 μm, or less, such as explained above. The fibrous materials may be comminuted to such small sizes before they are added to the mixture, or they may be fibrous materials of such a brittle or weak character that they are comminuted to the small particle sizes mentioned during the mixing process. Examples of suitable fibrous materials for this purpose are brans such as wheat bran, rye bran or pea bran or bean bran. When finely divided fibrous materials are included in the carrier, it is preferred that they constitute at the most 50% by weight of the carrier material, preferably at the most 20% by weight of the carrier and most preferably at the most 5% by weight of the carrier.

While extrusion is described in detail herein, it is contemplated that also other treatments which influence the mixture in a similar manner, such as high shear mixing and subsequent efficient exposure/distribution may be used to obtain the same effect. Such other treatments which result in the formation of substantially free-flowing powder products are considered "equivalents" to the extrusion herein.

In the present specification and claims, the term "surface-active" in its broadest sense indicates a product which is able to effectively "wet" the carrier under the mixing conditions prevailing. (Experiments have indicated that when a substance is used which is not a surface-active substance, the ideal formation of a suitable particulate product is not obtained.) It is believed that the fact that it is possible to obtain a substantially free-flowing particulate product even with viscous lipid surface-active substances is partly due to sorption of the surface-active substance by the carrier particles and partly due to the formation of small agglomerates of carrier particles with surface-active substance in menisci between the individual particles, thereby keeping several particles together in small agglomerates. The agglomerates will normally comprise a rather small number of individual particles and will therefore in themselves appear as fine particles; they will often tend to disintegrate into the individual particles when handled. At all events, the product prepared in the process will normally have a very even and homogeneous distribution of the surface-active substance on the carrier.

The mixing of the constituents is suitably performed immediately prior to the extrusion in the mixing/transport means of the extruding equipment. This transport means is typically a screw mixer such as a double screw mixer. The temperature in the last part of the screw mixer (and hence approximately the temperature of the mixture subjected to extrusion) is normally in the range of 100°–180° C., typically 110°–150° C. and often preferably 120°–140° C. The orifice or each orifice through which the mixture is extruded will normally have a diameter of from about ½ to about 8 mm; often, a diameter of about 1–4 mm, such as about 2 mm, is very well suited.

The mixture subjected to the extrusion will normally have a free water content (water which is not chemically bound) at 1–30% by weight, especially 5–25% by weight. In certain cases it may be found advantageous to add a small percentage of water, such as 0.1–5% by weight, in particular 0.1–3% by weight, to the mixer together with the surface-active substance and the carrier.

The optimum combination of particular conditions maintained in the extrusion, such as orifice diameter, rotational speed of the screws, the temperature of the mixtures extruded, and the rate with which the mixture is extruded, may be ascertained by preliminary test runs for each particular combination of surface-active substance and carrier; suitable values for these parameters are illustrated in the Examples.

The invention is further illustrated in the following Examples.

EXAMPLE 1

To an extruder of the type BC 45 supplied by Creusot-Loire, France, and comprising a double screw which rotates at a rotational speed of 180 r.p.m., and two nozzles of a diameter of 2 mm, part of the double screw length being cooled by means of a water jacket and the part of the double screw being adjacent to the nozzles being heated by means of an induction heating jacket, rice starch was supplied through an inlet funnel comprising two screws conveying the starch, and lecithin (a commercial product containing 62.4% by weight of soy lecithin not soluble in acetone, the remainder being soybean oil and a little protein, acid number 33.9) in molten form was supplied to the double screw through a tube. Through another tube to the extruder, 1.5% of water (calculated on the same percentage basis as the ester and the rice starch) was added. The weight ratio between the supply of lecithin and the supply of rice starch was 35% of lecithin to 65% of rice starch. The total amount supplied per hour was 45 kg.

The temperature of the screw part was thermostated to 130° C.

As a start up phase, a surplus of the lecithin and the water was added, and the product emerged as a semi-liquid or pasty liquid or paste-like string. When the water and lecithin supplied had been adjusted to the amounts referred to above, the product changed into a particulate free-flowing powder.

The product resulting from the extrusion was a free-flowing powder comprising the rice starch particles carrying the lecithin. The particle size of the powder was somewhat coarser than that of the rice starch and apparently consisted of small agglomerates, each comprising several rice starch particles bound together, probably due to the lecithin.

The product was used as a dough-improving flour additive in a similar manner as normal commercial lecithin. The product was added in an amount of 0.57% by weight, corresponding to an addition of 0.2% by weight, of the commercial lecithin. Due to its free-flowing powder character, the product was very easy to distribute in the flour. It was found that the product showed the same effects with respect to improvement of the baking properties of the doughs as the viscous lecithin liquid, calculated on the same amount of lecithin.

EXAMPLE 2

In the same extruder equipment as described in Example 1, a partial glycerol condensate ester emulsifier (prepared from fully hardened tallow fatty acids and a glycerol condensate mixture comprising 15% of monomeric glycerol, 60% of diglycerol and the remainder being higher glycerol condensates) was applied on wheat starch. The weight ratio between the polyglycerol partial ester and the wheat starch was 22.5% to 77.5%. The wheat starch was added through a funnel as in Example 1, and the polyglycerol partial ester was added through a tube in the same manner as described in Example 1. Through another tube to the extruder, 3% of water (calculated on the same percentage basis as the ester and the wheat starch) was added. The rotational speed was 200 r.p.m. The temperature of the extruder was kept at 120° C. during the extrusion.

The resulting product was a particulate, free-flowing product with a particle size slightly larger than the wheat starch particles, presumably due to a certain agglomeration of a small number of wheat starch particles into one particle in the product.

88 g of the product was subjected to a whipping test in a layer cake mix of the following composition:
- 405 g of granulate sugar
- 270 g of wheat flour
- 157 g of wheat starch
- 30 g of baking powder
- 50 g of milk powder
- 350 g of whole egg
- 350 g of water.

The product was mixed with the other ingredients immediately before the whipping. The results were as follows:

| Whipping time | Weight in grams/liter | | |
|---|---|---|---|
| | 3 minutes | 5 minutes | 10 minutes |
| Immediately after preparation | 350 | 355 | 350 |
| After 3 months of storage | 345 | 340 | 340 |

The whipping performance of the powder product prepared in accordance with the invention is considerably better than the whipping performance of similar products prepared by the traditional spray drying with skim milk.

EXAMPLE 3

In a similar manner as described in Example 2, 35% of the same polyglycerol partial esters as used in Example 2 was applied on 65% of rice starch. The amount of added water was 1.5%. The extruder screws were run at 200 r.p.m., and the temperature of the extruder was kept at 130° C.

The resulting product was free-flowing and comprised particles of the smaller size than in the previous examples.

57 g of the product was subjected to a whipping test in the same mix as described in Example 2 (the amount of wheat starch in the mix, however, being 188 g).

The whipping results were as follows:

| Whipping time | Weight in grams/liter | | |
|---|---|---|---|
| | 3 minutes | 5 minutes | 10 minutes |
| Immediately after preparation | 335 | 315 | 325 |
| After 3 months of storage | 360 | 330 | 340 |

Samples of the product were stirred into water and glycerol, respectively, and observed in a microscope. It was found that the product had disintegrated into individual particles of substantially the same size as the rice starch particles.

EXAMPLE 4

In the same manner as described in Example 2, a mixture of emulsifiers comprising 95% of the polyglycerol partial ester described in Example 2 and 5% of lactic acid ester of fully hardened tallow fatty acids was applied on rice starch. The weight ratio between the components was 35% of the emulsifier mixture and 65% of rice starch. The components were added in a total amount of 45 kg/h. Simultaneously with the emulsifier mixture, 1.5% of water was added. The extruder was run at 200 r.p.m., and the temperature of the extruder was 130° C.

The resulting product was free-flowing and comprised particles of the same size as the rice starch particles.

57 g of the product was subjected to a whipping test in the same mix as described in Example 2 (the amount of wheat starch in the mix, however, being 188 g).

The whipping results were as follows:

| Whipping time | Weight in grams/liter | | |
|---|---|---|---|
| | 3 minutes | 5 minutes | 10 minutes |
| Immediately after preparation | 310 | 340 | 340 |
| After 3 months of storage | 315 | 325 | 335 |

EXAMPLE 5

Comparison Example

In a similar manner as described in Example 2, 20% of the same polyglycerol partial esters as used in Example 2 was applied on 80% of wheat bran. The total amount of added components was 42.3 kg/h. Simultaneously with the partial esters, 3% of water was added. The extruder screws were run at 200 r.p.m., and the temperature of the extruder was kept at 120° C.

The resulting product did not have the same characteristic free-flowing particulate character as the products of the preceding examples. The product of the present example was a coarse, pellet-like product. In the whipping test, the product showed the following performance immediately after its preparation:

| Whipping time | Weight in grams/liter | | |
|---|---|---|---|
| | 3 minutes | 5 minutes | 10 minutes |
| Immediately after preparation | 485 | 460 | 440 |

Thus, it will be noted that the performance of the product is less good when no flour or starch is included in the carrier.

EXAMPLE 6

Comparison Example

Pure propyleneglycol ester of fully hardened stearic and tallow acid, which is not normally considered an emulsifier or a surface-active agent, was applied on rice starch in an experiment, the parameters of which were adapted to be similar to the parameters of Example 2. The amount of the propyleneglycol ester was 35% and the amount of rice starch was 65%. The total throughput was 45 kg/h, 1.5% of water being added. The temperature of the extruder was 130° C., and the rotational speed of the screws was 200 r.p.m.

The resulting product was extruded as a granulate and was obtained as small torn or rugged pieces.

These pieces were comminuted and subjected to the whipping test described in Example 2.

The results were as follows:

| Whipping time | Weight in grams/liter | | |
|---|---|---|---|
| | 3 minutes | 5 minutes | 10 minutes |
| Immediately after preparation | 1045 | 1045 | 980 |

Thus, it may be concluded that when a substance which is not a surface-active agent is applied on a particulate carrier using the equipment and conditions according to the invention, no free-flowing particulate product is obtained. In other words, the condition that the substance applied be a surface-active agent seems justified.

EXAMPLE 7

Series of experiments were performed to find the best set of parameters for a particular emulsifier to be applied on a particular carrier by the method of the invention.

The emulsifier was the same as the one used in Example 3.

First, using the same ratio between emulsifier and starch as in Example 3, the temperature in the extrusion was varied between 115°, 120°, 130° and 140° C. (It was not possible to keep a lower temperature than 115° C. with the cooling equipment available). The three minute whipping weights/liter were as follows:

| Extrusion temperature, °C. | Weight in grams/liter Whipping time, 3 minutes |
|---|---|
| 115 | 500 |
| 120 | 365 |
| 130 | 330 |
| 140 | 345 |

Thus, it was found that 130° C. was the best temperature for the rice starch. In the same way it was found that 120° C. is the best temperature for the wheat starch Then, the ratio of the emulsifier of Example 3 to rice starch was varied over the range 33:67, 35:65, 37:63, 39:61 and 41:59 on a weight percent basis. The remaining parameters were the same as used in Example 3. The resulting product was somewhat more greasy at the higher contents of emulsifier and somewhat more "sharp" and "hard" at the lower contents. The three minute whipping weights/liter were as follows:

| Ratio Emulsifier/Rice Starch | Weight in grams/liter Whipping time, 3 minutes |
|---|---|
| 33:67 | 495 |
| 35:65 | 370 |
| 37:63 | 405 |
| 39:61 | 605 |
| 41:59 | 795 |

The rotational speed of the screws was varied from 150 to 250 r.p.m. The whipping results were as follows:

| Rotational speed Rotations per minute | Weight in grams/liter Whipping time, 3 minutes |
| --- | --- |
| 150 | 380 |
| 175 | 330 |
| 205 | 315 |
| 225 | 315 |
| 250 | 380 |

The capacity, expressed in kg of product processed per hour was varied over the range of 35, 45, 55, 65 and 75 kg.

It was found that the variation of this parameter was not very critical, but that the highest capacities were not preferable.

The same parameters as used in Example 3 were used again, but the amount of added water was varied. The whipping results were as follows:

| Added water, % | Weight in grams/liter Whipping time, 3 minutes |
| --- | --- |
| 2 | 395 |
| 1½ | 335 |
| 1 | 345 |
| 0.5 | 355 |
| 0 | 360 |

The diameter of the nozzles was varied over the range 2, 4 and 6 mm. The results, expressed as 3 minutes whipping, weight/liter were as follows:

| Nozzle diameter | Weight in grams/liter Whipping time, 3 minutes |
| --- | --- |
| 2 mm | 310 |
| 4 mm | 390 |
| 6 mm | 455 |

EXAMPLE 8

In the same extruder equipment as described in Example 1, a partial glycerol condensate ester emulsifier (prepared from fully hardened tallow fatty acids and a glycerol condensate mixture comprising 15% of monomeric glycerol, 60% of diglycerol and the remainder being higher glycerol condensates, in other words the same emulsifier as was used in Example 2) was applied on a carrier consisting of a mixture of 50% by weight of rye flour and 50% of rice starch. The weight ratio between the polyglycerol partial ester and the carrier mixture was 25% to 75% by weight.

The total throughput was 45 kg/h, 2.3% of water being added. The temperature of the extruder was 125° C., and the rotational speed of the screws was 200 r.p.m.

The resulting product was free-flowing.

80 g of the product was subjected to a whipping test in the same mix as described in Example 2 (the amount of wheat starch in the mix, however, being 195 g).

The whipping results were as follows:

| Whipping time | Weight in grams/liter | | |
| --- | --- | --- | --- |
| | 3 minutes | 5 minutes | 10 minutes |
| Immediately after preparation | 315 | 335 | 345 |
| After 3 months of storage | 360 | 330 | 340 |

An additional whipping test was performed using the same mix and the same proportion, but after the extruded powdery product had been stored together with the other mix constituents, rather than separate from the other mix constituents. This test simulates the conditions to which the product will be subjected when it is incorporated in pre-mixed products to which only water and egg is added when the product is to be used. The whipping results were as follows:

| Whipping time | Weight in grams/liter | | |
| --- | --- | --- | --- |
| | 3 minutes | 5 minutes | 10 minutes |
| After 3 months of storage | 370 | 365 | 340 |

The tests show that the product has excellent properties as an emulsifier and is capable of retaining these properties to a very satisfactory extent when stored together with cake mix constituents.

EXAMPLE 9

In the same extruder equipment as described in Example 1, a "high mono" partial glycerol condensate ester emulsifier consisting of 90% monoester and at the most 1% free glycerol, acid number less than 3, the acids with which the glycerol was esterified being a mixture of saturated $C_{16-18}$ monocarboxylic acids, was applied on rice starch as carrier. The weight ratio between the emulsifier and the carrier was 35% by weight of the emulsifier and 65% of the rice starch.

The total throughput was 45 kg/h, 1.5% of water being added. The temperature of the extruder was 135° C., and the rotational speed of the screws was 200 r.p.m. The resulting free-flowing product is suitable for use in yeast doughs and paste products, such as spaghetti.

What is claimed is:

1. A method for preparing a substantially free-flowing powder product which comprises mixing a surface-active substance of lipid character with a particulate carrier which is capable of sorbing the surface-active substance to form a mixture, the amount of surface-active substance being 10–60% by weight calculated on the total weight of the surface-active substance and the carrier, and extruding the mixture at a temperature of 100°–180° C. through one or several orifices to obtain, as an immediate result of the extrusion, a powder product comprising the surface-active substance applied on the particulate carrier.

2. A method according to claim 1, wherein the surface active substance comprises a partial ester of a polyhydric alcohol which contains an edible fatty acid moiety.

3. A method according to claim 2, wherein the polyhydric alcohol is selected from the group consisting of ethylene glycol, glycerol, condensates of ethylene glycol, condensates of glycerol, sugars, and sorbitol.

4. A method according to claim 2, wherein the partial ester, in addition to the edible fatty acid moiety, also contains a moiety derived from an acid selected from the group consisting of lactic acid, citric acid, malic acid, tartaric acid, and acetic acid.

5. A method according to claim 2, wherein, in addition to the surface active substance, the mixture to be subject to the extruding treatment also contains a partial ester of propylene glycol or of a condensate of propylene glycol which contains a fatty acid moiety.

6. A method according to claim 1, wherein the carrier is of a vegetable origin.

7. A method according to claim 6, wherein the carrier is selected from the group consisting of flours, starches, mono- and disaccharides, pentosans, and mixtures thereof.

8. A method according to claim 7, wherein the carrier additionally comprises a material of vegetable fibre origin.

9. A method according to claim 7, wherein the carrier is selected from the group consisting of tuber starches, tuber flours, cereal starches, cereal flours, maltodextrins, dextrose, fructose, and mixtures thereof.

10. A method according to claim 1, wherein the weight percentage of surface active substance in the mixture is in the range of 20-50%, calculated on the basis of the total weight of the surface active substance and the carrier.

11. A method according to claim 1, wherein the weight percentage of surface active substance in the mixture is in the range of 15-40%, calculated on the basis of the total weight of the surface active substance and the carrier.

12. A method according to claim 1, wherein the temperature of the mixture subjected to extrusion is in the range of 120°-140° C.

13. A substantially free-flowing powder product produced by the method of claim 1.

14. A method in accordance with claim 14, wherein the particular carrier has a size in the range of 1-20 μm.

UNITED STATES PATENT AND TRADEMARK OFFICE
CERTIFICATE OF CORRECTION

PATENT NO. : 4,748,027
DATED : May 31, 1988
INVENTOR(S) : SCHOU, ET AL.

It is certified that error appears in the above-identified patent and that said Letters Patent is hereby corrected as shown below:

In claim 13, change "A substantially free-flowing powder product produced by the method of claim 1" to --A method in accordance with claim 1, wherein the particulate carrier has a size in the range of 1-100 µm--. In claim 14, change "14" to --13--, and change "particular" to --particulate--.

Signed and Sealed this

Twentieth Day of March, 1990

Attest:

JEFFREY M. SAMUELS

Attesting Officer

Acting Commissioner of Patents and Trademarks